(12) United States Patent
Augustyn et al.

(10) Patent No.: US 11,273,875 B2
(45) Date of Patent: Mar. 15, 2022

(54) VEHICLE PANEL CONNECTING STRUCTURES INCLUDING ANTI-ROTATION MEMBERS

(71) Applicants: Toyota Motor Engineering & Manufacturing North America, Inc., Plano, TX (US); Hinduja Tech, Inc., Novi, MI (US)

(72) Inventors: Nick Augustyn, Ypsilanti, MI (US); Majid Shaikh, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 71 days.

(21) Appl. No.: 16/844,431

(22) Filed: Apr. 9, 2020

(65) Prior Publication Data

US 2021/0316795 A1 Oct. 14, 2021

(51) Int. Cl.
*B62D 27/02* (2006.01)
*B62D 25/00* (2006.01)

(52) U.S. Cl.
CPC ........... *B62D 27/023* (2013.01); *B62D 25/00* (2013.01)

(58) Field of Classification Search
CPC ...... B62D 27/02; B62D 27/023; B62D 27/06; B62D 27/065; B62D 25/00; B62D 25/02; B62D 25/04; B62D 35/007; B62D 35/008

USPC ........ 296/29, 191, 180.1, 1.08; 411/166, 81, 411/116, 117, 141, 143

See application file for complete search history.

(56) References Cited

U.S. PATENT DOCUMENTS

| 7,530,629 | B2 * | 5/2009 | King | B62D 25/163 280/154 |
| 8,746,774 | B2 * | 6/2014 | Yasuhara | B60Q 1/28 296/78.1 |

FOREIGN PATENT DOCUMENTS

| JP | 2002286004 A | 10/2002 | |
| JP | 2003090307 A | 3/2003 | |
| KR | 19980033310 U | * 9/1998 | ............. B62D 25/00 |
| KR | 19990041275 A | 6/1999 | |
| KR | 100610956 B1 | 8/2006 | |
| KR | 1795577 B1 | * 12/2017 | ............. B29C 65/18 |
| WO | 2015050025 A1 | 4/2015 | |

* cited by examiner

*Primary Examiner* — Dennis H Pedder
(74) *Attorney, Agent, or Firm* — Dinsmore & Shohl LLP

(57) ABSTRACT

An exterior accessory panel that connects to a vehicle includes a vehicle panel connecting structure including a boss structure including a fastener receiving member having a fastener receiving opening extending therethrough that aligns with a fastener receiving opening of an exterior body panel of the vehicle and an anti-rotation flange that extends outward from the fastener receiving member toward the exterior body panel adjacent to a stop member of the exterior body vehicle panel that inhibits rotation of the anti-rotation flange and boss structure during a torqueing operation on a fastener extending through the fastener receiving openings.

14 Claims, 5 Drawing Sheets

VEHICLE PANEL CONNECTING STRUCTURES INCLUDING ANTI-ROTATION MEMBERS

TECHNICAL FIELD

The present specification generally relates to vehicle panel connecting structures, and more specifically, vehicle panel connecting structures that include anti-rotation members.

BACKGROUND

Many vehicles include a number of vehicle body panels. It is often the case that components of the vehicles are formed by two or more vehicle body panels that are connected together. Fasteners may be used to connect adjacent vehicle body panels. The fasteners may need to be tightened in order to firmly secure the vehicle body panels together. In the process of tightening the fasteners, the torque applied to the fasteners during the tightening process can be transferred to the vehicle body panels being connected together causing the vehicle body panels to twist or otherwise deform.

Accordingly, a need exists for vehicle panel connecting structures that include anti-rotation members.

SUMMARY

In one embodiment, a vehicle includes a vehicle body including multiple vehicle panels including a first vehicle panel and a second vehicle panel adjacent the first vehicle panel. The first vehicle panel includes a fastener receiving portion having a fastener receiving opening extending therethrough and the second vehicle panel includes a vehicle panel connecting structure. The vehicle panel connecting structure includes a boss structure including a fastener receiving member having another fastener receiving opening extending therethrough that is aligned with the fastener receiving opening of the fastener receiving portion and an anti-rotation flange that extends outward from the fastener receiving member toward the first vehicle panel adjacent to a stop member of the first vehicle panel that inhibits rotation of the anti-rotation flange and the boss structure during a torqueing operation on a fastener extending through the fastener receiving openings.

In another embodiment, an exterior accessory panel that connects to a vehicle includes a vehicle panel connecting structure including a boss structure including a fastener receiving member having a fastener receiving opening extending therethrough that aligns with a fastener receiving opening of an exterior body panel of the vehicle and an anti-rotation flange that extends outward from the fastener receiving member toward the exterior body panel adjacent to a stop member of the exterior body vehicle panel that inhibits rotation of the anti-rotation flange and the boss structure during a torqueing operation on a fastener extending through the fastener receiving openings.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Vehicles according to the present specification include a vehicle body that includes multiple vehicle body panels, such as an exterior body panel and an exterior accessory panel. The exterior body panel may be a vehicle door panel and the exterior accessory panel may be a side spoiler panel. The exterior body panel is connected to the exterior accessory panel by a vehicle panel connecting structure. The vehicle panel connecting structure includes a boss structure having a fastener receiving opening extending therethrough. The fastener receiving opening is aligned with another fastener receiving opening formed through a fastener receiving portion of the exterior body panel. The boss structure includes a fastener receiving member having the fastener receiving opening and a flange that extends outward from the fastener receiving member toward the interior body panel. The flange engages a stop member located on the interior body panel to inhibit rotation of the boss structure during torqueing of the fastener.

Figure 1:
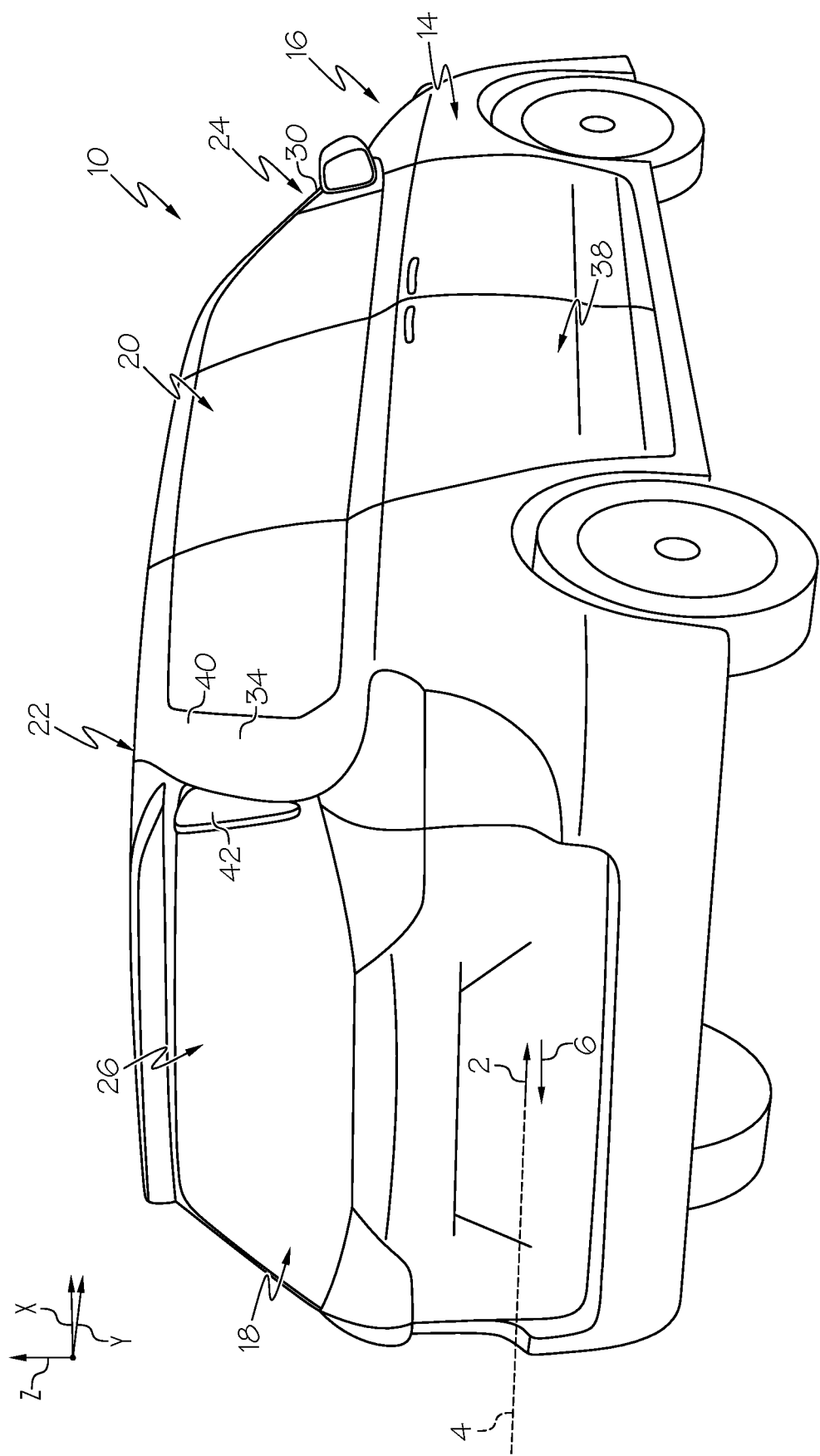
FIG. 1 illustrates a rear perspective view of a vehicle including an exterior accessory panel, according to one or more embodiments shown and described herein.

As used herein, the term "vehicle longitudinal direction" refers to the forward-rearward direction of the vehicle (i.e., in the +/−vehicle X-direction depicted in FIG. 1). The term "vehicle lateral direction" refers to the cross-vehicle direction (i.e., in the +/−vehicle Y-direction depicted in FIG. 1), and is transverse to the vehicle longitudinal direction. The term "vehicle vertical direction" refers to the upward-downward direction of the vehicle (i.e., in the +/−vehicle Z-direction depicted in FIG. 1). Further, the terms "inboard," "inward," "outboard" and "outward" are used to describe the relative positioning of various components of the vehicle. Referring to FIG. 1, the terms "outboard" or "outward" as used herein refers to the relative location of a component in direction 2 with respect to a vehicle centerline 4. The term "inboard" or "inward" as used herein refers to the relative location of a component in direction 6 with respect to the vehicle centerline 4. Because the vehicle structures may be generally symmetrical about the vehicle centerline 4, the direction to which use of terms "inboard," "inward," "outboard" and "outward" refer may be mirrored about the vehicle centerline 4 when evaluating components positioned along opposite sides of the vehicle 10.

The vehicle 10 includes a body 14 having a front 16, a rear 18 and sides 20 that extend between the front 16 and the rear 18. A roof assembly 22 of the vehicle 10 extends between the sides 20 and between a front windshield 24 and a rear window 26. The body further includes front pillars 30 and rear pillars 34. The rear pillars 34 may form part of rear door assemblies 38 and may include exterior body panels 40 that form exterior facing surfaces that are visible from outside the vehicle 10.

An exterior accessory panel 42 may be connected to the exterior body panel 40. The exterior accessory panel 42 may be, for example, a side spoiler. While a side spoiler for the exterior accessory panel 42 is described herein the exterior accessory panel 42 may be any other panel type including another exterior body panel. Generally, a spoiler may be used on a vehicle to control air flow around the vehicle. However, in some embodiments, a spoiler may have little, if any, aerodynamic benefit and may be used to alter an appearance of the vehicle. In the illustrated example, the exterior accessory panel 42 is connected to the exterior body panel 40 at a location corresponding to the rear window 26. The exterior accessory panel 42 or multiple exterior accessory panels may be positioned at any other suitable location on the vehicle 10, such as at the front and/or rear of the vehicle 10.

Figure 2:
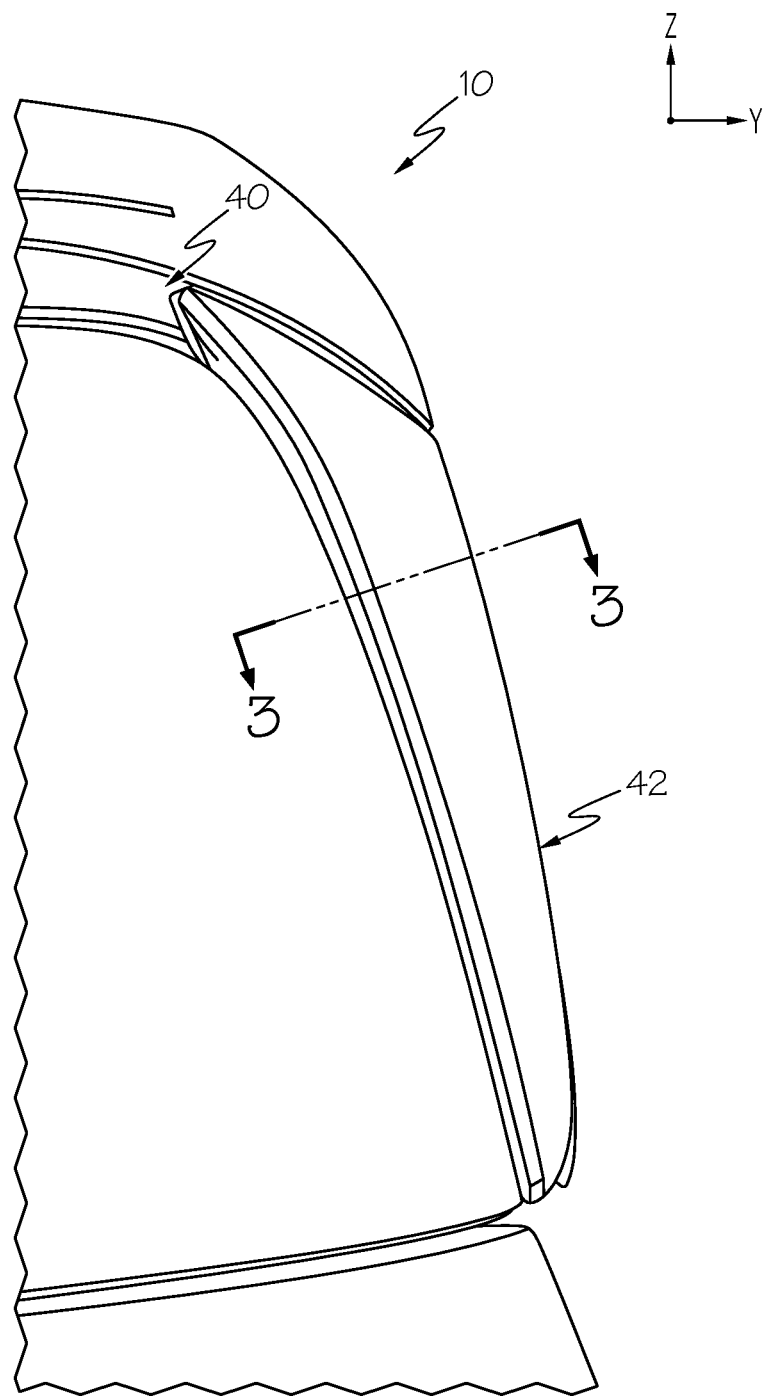
FIG. 2 is a detail view showing the vehicle with the exterior accessory panel, according to one or more embodiments shown and described herein.
Figure 3:
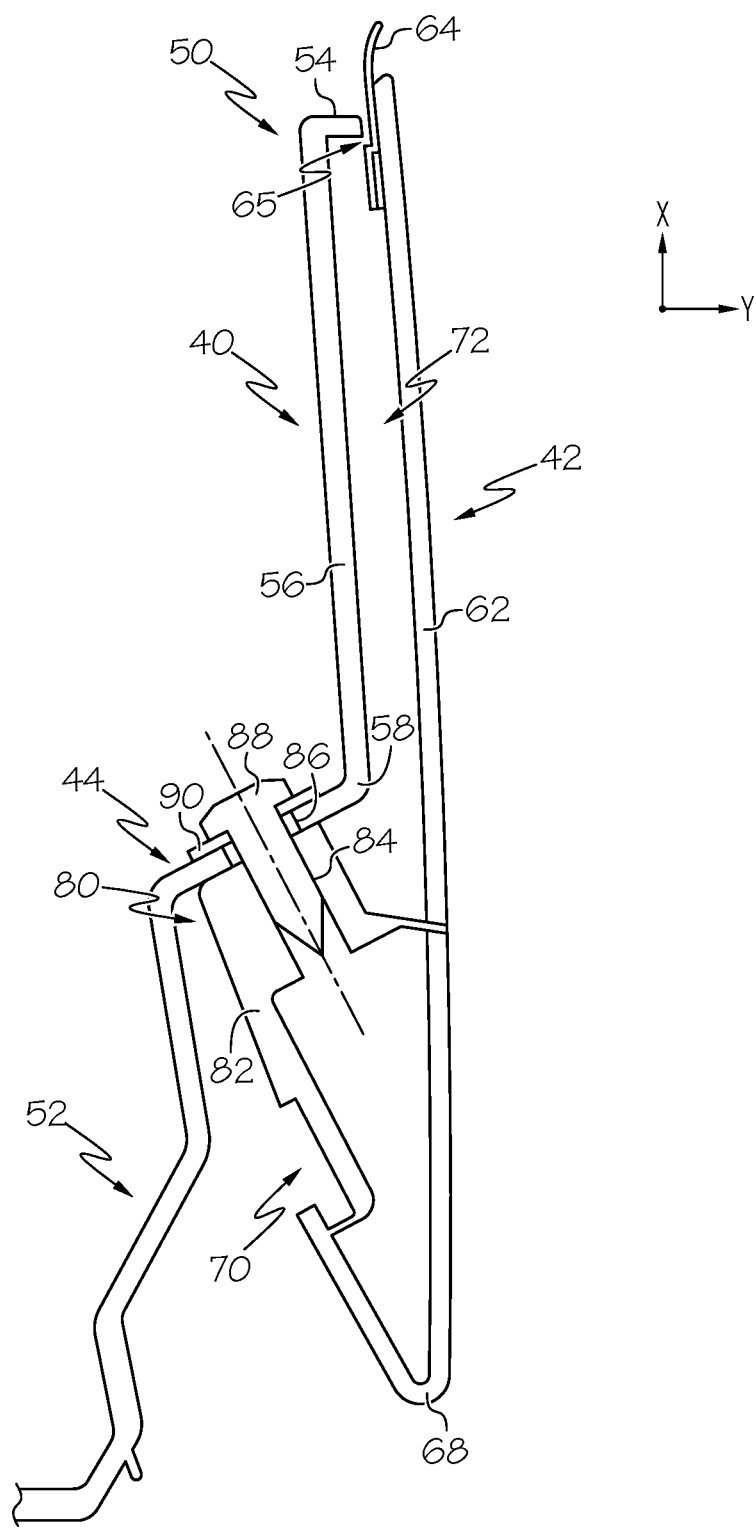
FIG. 3 is a section view of the exterior accessory panel and a vehicle body panel along line 3-3 of FIG. 2, according to one or more embodiments shown and described herein.

Referring to FIG. 2, a detail view of the exterior accessory panel 42 is illustrated. The exterior accessory panel 42 is connected to the exterior body panel 40 that at least partially underlies the exterior accessory panel 42. In some embodiments, the exterior body panel 40 may be larger in area than the exterior accessory panel 42, such as at least twice in area, such as at least four times in area, etc. Due, at least in part, to the size difference between the exterior body panel 40 and the exterior accessory panel 42, referring to FIG. 3, the exterior body panel 40 may include a fastener receiving portion 44 that is relatively horizontally arranged on the vehicle 10 compared to adjacent vertical portions. In the example of FIG. 3, the exterior body panel 40 includes forward portion 50, the fastener receiving portion 44 and a rearward portion 52. The forward portion 50 includes a laterally extending ledge 54 that extends toward the exterior accessory panel 42, a forward wall 56 that extends longitudinally from the laterally extending ledge 54. The fastener receiving portion 44 includes a lateral wall 58 that extends in both the vehicle lateral and longitudinal directions from the forward wall 56 to a rearward wall 60.

The exterior accessory panel 42 includes an outer-facing longitudinal wall 62 that extends longitudinally beyond the laterally extending ledge 54 of the exterior body panel 40. A seal member 64 may be connected to a terminal end 66 of the longitudinal wall 62 of the exterior accessory panel 42. The seal member 64 may at least partially close a gap 65 between the exterior accessory panel 42 and the exterior body panel 40. The longitudinal wall 62 terminates at a corner 68. A vehicle panel connecting structure 70 extends in both the vehicle longitudinal and lateral directions toward the fastener receiving portion 44 of the exterior body panel 40. The vehicle panel connecting structure 70 along with the corner 68 and the longitudinal wall 62 together form a V-shape that is enclosed except for the gap 65, which can allow airflow into and out of cavity 72.

The vehicle panel connecting structure 70 may be a monolithic part of the rest of the exterior accessory panel 42. The vehicle panel connecting structure 70 includes a boss structure 80 that includes a fastener receiving member 82 that abuts the fastener receiving portion 44. While only a single fastener receiving member 82 is illustrated, there may be an array of fastener receiving members 82 that are aligned in the vehicle vertical direction along the height of the exterior accessory panel 42. The fastener receiving member 82 has a fastener receiving opening 84 that extends therethrough. The fastener extending opening 84 is aligned with another fastener receiving opening 86 that extends through the fastener receiving portion 44. To connect the exterior accessory panel 42 to the exterior body panel 40, a fastener 88 may extend through the aligned fastener receiving openings 84 and 86. A washer 90 or other load distribution member may be used to reduce pressure against the fastener receiving portion 44.

Figure 4:
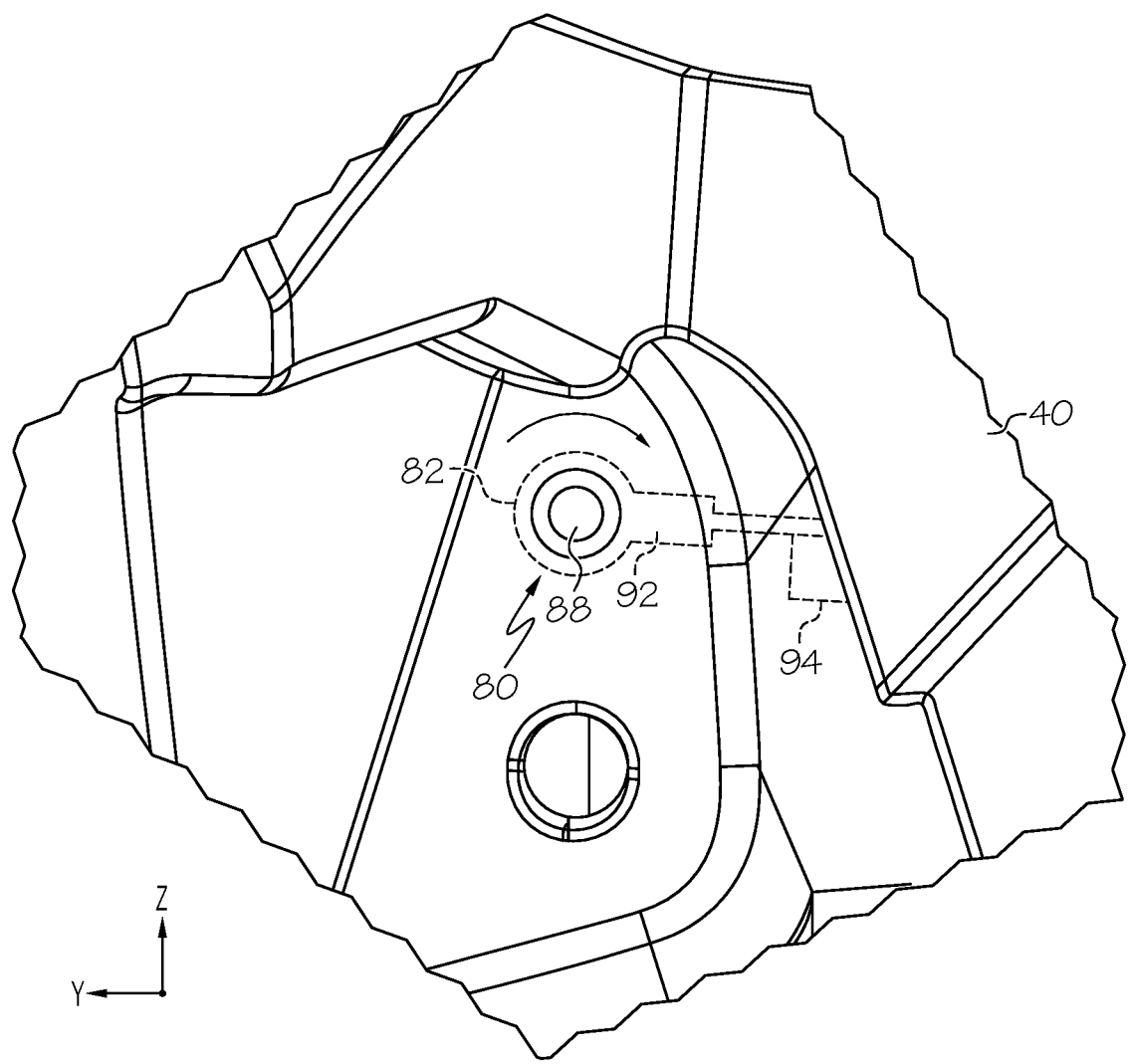
FIG. 4 illustrates a connecting structure between the exterior accessory panel and the vehicle body panel, according to one or more embodiments shown and described herein.
Figure 5:
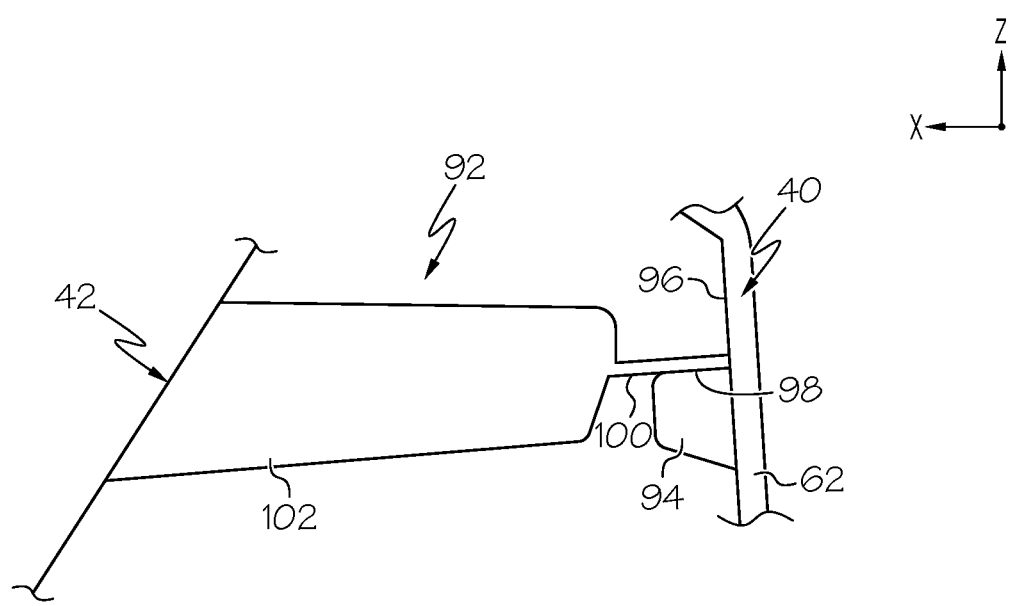
FIG. 5 illustrates operation of a boss structure with a fastener receiving member and an anti-rotation flange, according to one or more embodiments shown and described herein.

Referring to FIGS. 4 and 5, the boss structure 80 includes the fastener receiving member 82 and an anti-rotation flange 92 that extends outward from the fastener receiving member 82 in the vehicle lateral direction toward the exterior body panel 40. In some embodiment, the anti-rotation flange 92 may be connected to an inside of the longitudinal wall 62. Torqueing of the fastener 88 may tend to cause the boss structure 80 to rotate. A stop member 94 is provided that inhibits rotation of the boss structure 80. The stop member 94 may be mounted to an interior surface 96 of the longitudinal wall 62 at a location adjacent the anti-rotation flange 92. The stop member 94 may be formed of any suitable material, such as rubber, plastic, etc. In some embodiments, the stop member 94 may be formed with the exterior accessory panel 42. A small gap 98 (e.g., 0.2 inch) may be provided between the anti-rotation flange 92 and the stop member 94. In some embodiments, a narrow portion 100 of the anti-rotation flange 92 may be thinner than a wider portion 102 of the anti-rotation flange 92 to provide increased flexibility and reduce forces applied to the longitudinal wall 62 during a torqueing process compared to if the stop member 94 is not present. For example, the anti-rotation flange 92 may tend to pull on the longitudinal wall 62 if the boss structure 80 rotates, which may create a divot at the location of the anti-rotation flange 92 on the longitudinal wall 62. The stop member 94 can inhibit such rotation of the boss structure 80 and formation of any divot.

The above-described vehicle panel connecting structures can be used to connect adjacent vehicle panels together. The vehicle panel connecting structures may be formed as part of one of the vehicle panels and include a boss structure that includes a fastener receiving member having a fastener receiving opening that receives a fastener that extends through the other of the vehicle panels. An anti-rotation flange extends outward from the fastener receiving member toward the other vehicle panel. The anti-rotation flange engages a stop member located on the other vehicle panel to inhibit rotation of the boss structure during torqueing of the fastener, which can inhibit rotation of the boss structure.

The above-described exterior accessory panels including the vehicle connecting structures can be formed of any suitable methods and materials, such as a molding process using a plastic material. Multiple processes and materials may be used, such as different types of plastic materials. The exterior accessory panels may be formed of a first material, such as plastic, and the exterior body panels may be formed of a different material, such as metal.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
a vehicle body comprising multiple vehicle panels including a first vehicle panel and a second vehicle panel adjacent the first vehicle panel, the first vehicle panel comprising a fastener receiving portion having a fastener receiving opening extending therethrough and the second vehicle panel comprising an outer facing longitudinal wall and a vehicle panel connecting structure spaced inward from the outer facing longitudinal wall, the vehicle panel connecting structure comprising:
a boss structure comprising a fastener receiving member having another fastener receiving opening extending therethrough that is aligned with the fastener receiving opening of the fastener receiving portion and an anti-rotation flange that extends outward from the fastener receiving member toward the first vehicle panel adjacent to a stop member mounted to an interior surface of the first vehicle panel that inhibits rotation of the anti-rotation flange and the boss structure during a torqueing operation on a fastener extending through the fastener receiving openings.

2. The vehicle of claim 1, wherein the anti-rotation flange is connected to the first vehicle panel.

3. The vehicle of claim 2, wherein the anti-rotation flange comprises a relatively narrow portion at the first vehicle panel and a relatively wide portion at the fastener receiving member.

4. The vehicle of claim 1, wherein the first panel is an exterior body panel and the second vehicle panel is an exterior accessory panel that comprises the outer facing longitudinal wall and the vehicle panel connecting structure formed as monolithic parts of the exterior accessory panel.

5. The vehicle of claim 4, wherein the outer facing longitudinal wall and the vehicle panel connecting structure are connected at a corner forming a V-shape.

6. The vehicle of claim 5, wherein the outer facing longitudinal wall extends to a terminal end that is spaced laterally from the exterior body panel forming a gap therebetween.

7. The vehicle of claim 6, wherein the exterior accessory panel and the exterior body panel partially enclose a cavity that is open at the gap.

8. The vehicle of claim 4, wherein the exterior body panel comprises a forward portion and a rearward portion with the fastener receiving portion extending in both vehicle longitudinal and lateral directions between the forward and rearward portions, the fastener receiving member engaged with the fastener receiving portion.

9. The vehicle of claim 1, wherein a gap is provided between the stop member and the anti-rotation flange.

10. An exterior accessory panel that connects to a vehicle, comprising:
an outer facing longitudinal wall; and
a vehicle panel connecting structure spaced inward from the outer facing longitudinal wall, the vehicle panel connecting structure comprising a boss structure comprising a fastener receiving member having a fastener receiving opening extending therethrough that aligns with a fastener receiving opening of an exterior body panel of the vehicle and an anti-rotation flange that extends outward from the fastener receiving member toward the exterior body panel adjacent to a stop member mounted to an interior surface of the exterior body vehicle panel that inhibits rotation of the anti-rotation flange and the boss structure during a torqueing operation on a fastener extending through the fastener receiving openings.

11. The exterior accessory panel of claim 10, wherein the anti-rotation flange is configured to connect to the exterior body panel.

12. The exterior accessory panel of claim 11, wherein the anti-rotation flange comprises a relatively narrow portion and a relatively wide portion at the fastener receiving member.

13. The exterior accessory panel of claim 10 wherein, the outer facing longitudinal wall and the vehicle panel connecting structure formed as monolithic parts of the exterior accessory panel.

14. The exterior accessory panel of claim 13, wherein the outer facing longitudinal wall and the vehicle panel connecting structure are connected at a corner forming a V-shape.

* * * * *